United States Patent [19]
Barnes

[11] 3,979,056
[45] Sept. 7, 1976

[54] MULTI-PRODUCT COOKING COMPUTER

[75] Inventor: Miles J. Barnes, Woodbridge, Conn.

[73] Assignee: Food Automation Service Techniques, Inc., Stratford, Conn.

[22] Filed: Aug. 25, 1975

[21] Appl. No.: 607,189

[52] U.S. Cl. .................. 235/92 MT; 235/92 CT; 235/92 R; 99/333; 219/489
[51] Int. Cl.² .................. G06M 3/02; A47J 27/62
[58] Field of Search ......... 235/92 T, 92 PE, 92 MT, 235/92 CT, 132 E; 99/328, 333; 58/24 A; 219/489, 491; 73/343 R

[56] References Cited
UNITED STATES PATENTS

| | | | |
|---|---|---|---|
| 3,062,943 | 11/1962 | Euler | 219/489 X |
| 3,301,058 | 1/1967 | Roberts | 235/92 MT |
| 3,827,345 | 8/1974 | Willson | 219/489 X |

*Primary Examiner*—Joseph M. Thesz
*Attorney, Agent, or Firm*—Haynes N. Johnson

[57] ABSTRACT

An indicating type timing device for use in fast food preparation is provided to time cooking processes in which a food product is cooked by immersing it in a heated cooking medium. Since various food products, such as french fries, fried onion rings, fried fish, and the like require different cooking times, the unit is adapted to properly time the cooking of these different products, irrespective of the initial temperature of the food product or the cooking time.

The timing device uses a voltage controlled oscillator and associated counting circuit. The base frequency of the oscillator is set by the charge on the capacitor in one of a selected series of RC timing circuits. A thermistor continually measures the temperature of the cooking medium (such as shortening) and produces a voltage that varies the base frequency of the oscillator (increasing the frequency for increased measured temperatures). When the counting circuit has received a pre-determined number of pulses, it actuates a warning system advising the operator that the cooking is complete.

The frequency of oscillation varies as a logarithmic function of the thermistor voltage. Similarly, required cooking time is a logarithmic function of cooking temperature. Consequently, operations on the proper portion of the respective curves assures uniformity of cooking times.

A series of gang switches allow the operator to adjust the length of cooking time for the food product being cooked by using different resistors in the RC circuit.

The unit may also operate in parallel for multiple cooking units, utilizing the same warning signal system.

Comparative output voltages from the thermistor are also used to actuate lights advising the operator when the shortening has reached the desired temperature so that cooking may commence, and also to actuate an overheat warning circuit.

18 Claims, 5 Drawing Figures

MULTI-PRODUCT COOKING COMPUTER

BACKGROUND OF THE INVENTION

The field of the present invention relates to cooking timers, and, more particularly, timing control circuits which adjust the cooking time for varying temperatures of the heated cooking medium and of the food product. This achieves a uniform degree of doneness, batch to batch, irrespective of these variations.

Cooking is, essentially, the addition of heat energy, i.e., caloric input, to food. The food is cooked when the proper amount of heat input has been achieved. The necessary amount of heat input depends upon the original temperature of the food product being cooked, the total quantity of food being cooked, and the nature of the food product. The rate at which the heat input total is achieved depends upon the temperature of the cooking medium. These, then, are reflected in two factors that must be considered in cooking: first, the temperatures of the cooking medium (which is reduced when a cold food product is put in it) and, second, the characteristics of the food itself.

Certain prior art circuits provide cooking time computation by using a resistance-capacitor ("RC") integrating circuit with the charging voltage of the RC circuit being varied according to the temperature, together with a separate trigger circuit actuated when the voltage across the capacitor reaches a predetermined level. An example is shown in Martino U.S. Pat. No. 3,326,692. Capacitor integrating time varies inversely with temperature, thus compensation for different temperatures of the cooking medium and the food is provided.

The present timing device or cooking computer accomplishes the desired cooking timing for a multiplicity of food types by utilizing a temperature sensitive probe in combination with circuitry that is adjustable for particular food types. The circuitry also is of a unique type in that it provides far greater accuracy in cooking times than has been available in the past.

SUMMARY OF THE INVENTION

The cooking computer of this invention serves to time the cooking of fried foods in the shortening vat. It is capable of timing the cooking of a variety of foods and in a more precise manner than has been done by prior computers.

A thermistor probe is positioned in the heated cooking shortening to take a continuous temperature reading, which reading is reflected as a voltage output. This voltage output is one of two which are used to control the rate of oscillation of a voltage controlled oscillator. The other voltage used is that of the capacitor in an RC resistor-capacitor circuit. The same capacitor is used regardless of the food product being cooked, but, through interlocked gang switches, any one of a series of different precision resistors may be placed in series with the capacitor to vary the rate of charge, i.e., to adjust for the type of food being cooked.

The voltage controlled oscillator has a base frequency determined by the voltage on the capacitor in the RC circuit. The probe voltage serves to vary that rate of oscillation; higher temperatures of the cooking medium produce lower output voltages and, so, a more rapid rate of oscillation. Since both rate of cooking and rate of capacitor charge are logarithmic functions, cooking time can be correct under all conditions when corresponding portions of the capacitor charging and temperature curves are used.

The output of the voltage controlled oscillator goes to a counting circuit. When the counter counts a predetermined number of cycles of oscillation, the proper cooking time has elapsed, so warning circuitry is actuated to advise the operator that the food is cooked.

The thermistor output is also used to actuate circuitry advising the operator when the shortening has reached cooking temperature, and warning circuitry to advise the operator in the event the shortening overheats.

DETAILED DESCRIPTION OF THE INVENTION

Figure 1:
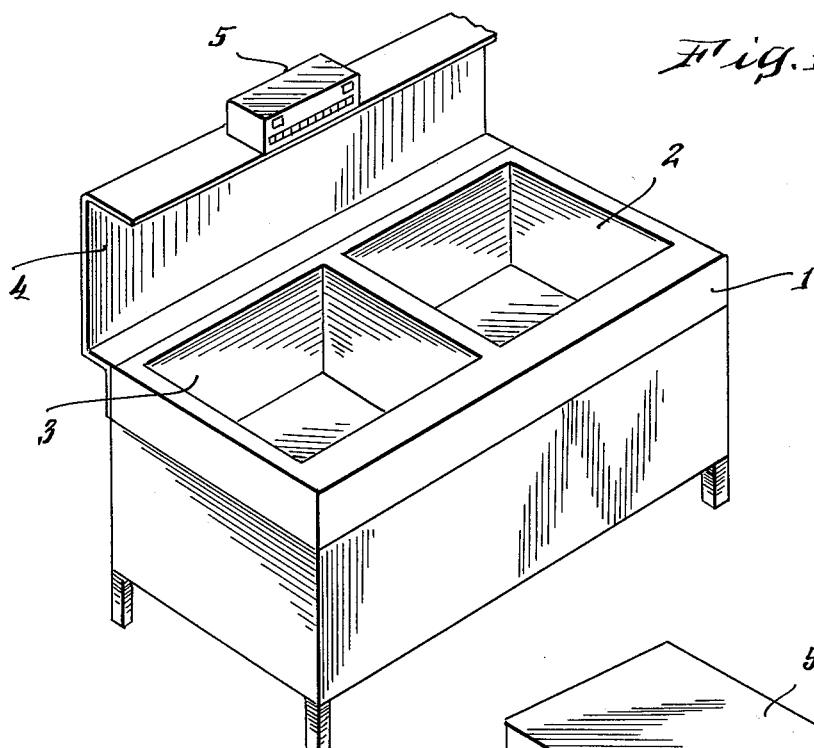
FIG. 1 is a perspective view of a deep fat fryer having two containers or vats for hot shortening or oil. The computer of this invention is shown mounted on the top of the back board of the unit.

FIG. 1 shows deep fat frying unit 1 having cooking vats 2 and 3. Mounted on top of a back board 4 is the cooking computer 5 of the present invention. Temperature sensing thermistor probes, not shown, are positioned in the shortening vats 2 and 3 and are interconnected through wires to computer unit 5.

Figure 2:
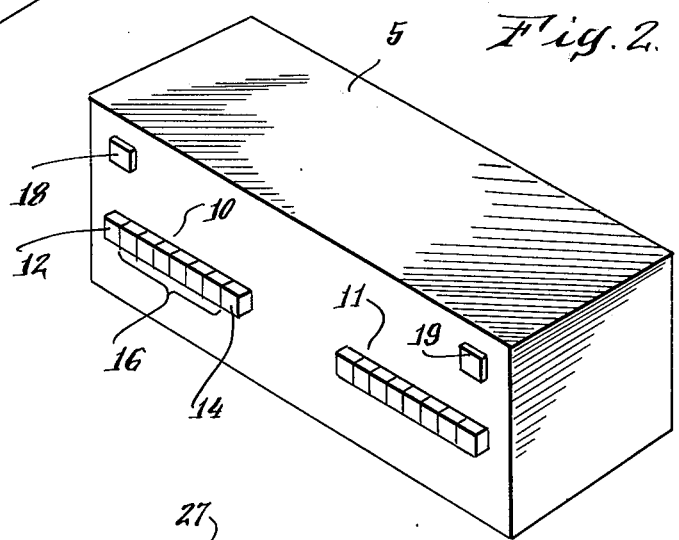
FIG. 2 is a perspective view of the computer timer as it would be seen by the user.

Computer 5, shown in FIG. 2, contains two duplicate sets of timing circuits represented by the control buttons in groups 10 and 11. Since they are similar in operation, only the controls of group 10 will be described. The far left button 12 is the "off" button; the far right button 14 is the test button; and the intermediate buttons 16 are "start" buttons for timing of particular foods. The buttons are ganged together, on an interlock basis, so that only one of the food item buttons may be pressed at a time. Thus the first of the buttons 16 may be for french fries, the next for onion rings, the next for fish, and so on. Each of the buttons is translucent and so capable of being illuminated from the rear, as will be described below.

Computer 5 also has a "ready" light 18 and an "overheat" light 19. Not shown, because internal to the unit, is a buzzer.

Figure 3:
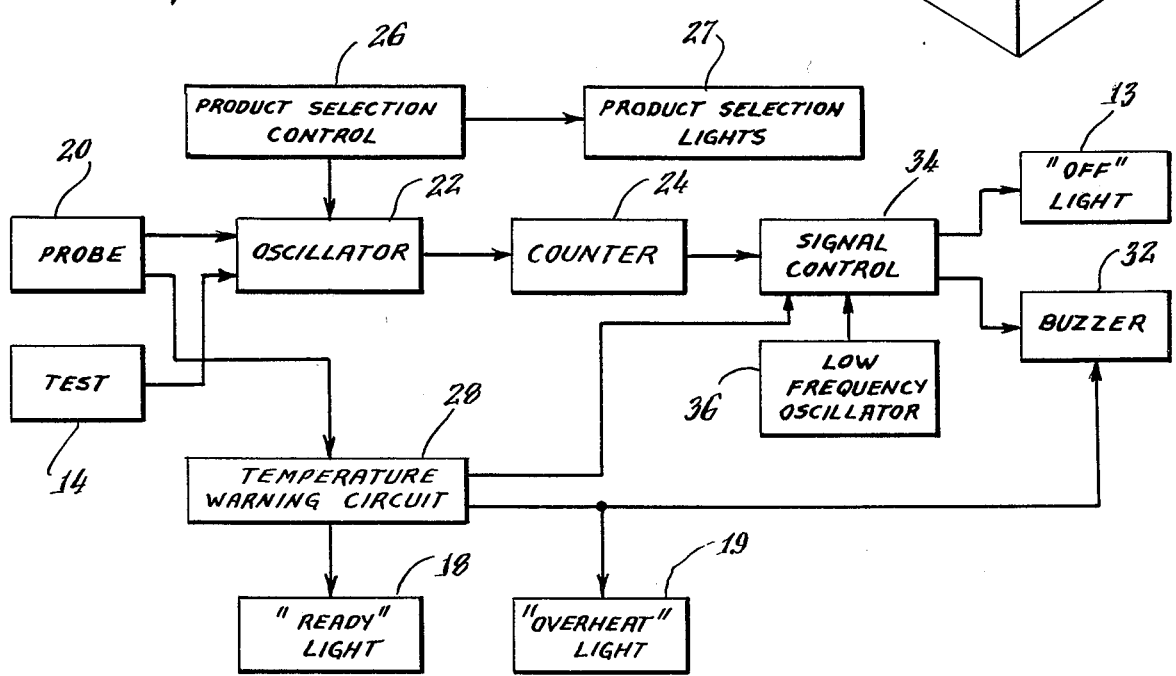
FIG. 3 is a simplified diagram showing in a general way how the computer circuit of this invention operates.

FIG. 3 shows, in a generalized way, the operation of the cooking computer unit 5. It shows only one of the two units 10 and 11 since they are duplicates, except that the computer 5 utilizes a common temperature warning circuit, "ready" light 18, "overheat" light 19, and buzzer 32.

Temperature sensing probe 20 is positioned in one of the cooking vats 2 or 3 and produces a voltage corresponding to, i.e., functionally related to, the temperature of the cooking oil. The output of probe 20 goes to the timing circuit, represented by oscillator 22 and counter 24 in conjunction with product selection control 26, and also to the temperature warning circuit 28. The temperature warning circuit will actuate "ready" light 18 when the shortening has reached the requisite temperature for cooking, usually considered about 330°F. It will also actuate "overheat" light 19 and buzzer 32 if the shortening becomes too hot. Normally the warning is set for 375°F, below the fire danger level of 425°.

The voltage from probe 20 and product selection control 26 (represented by buttons 16) determine the rate of oscillation of oscillator 22. Pulses lead from oscillator 22 to counter 24. When sufficient pulses have been received by counter 24, the counter actuates a signal control 34 which in turn lights "off" signal 13 and actuates buzzer 32. Low frequency oscillator 36 is associated with signal control 34, so that the "off" light and buzzer go off and on at a rate of about twice a second. In the preferred design, counter 24 actuates signal control 34 when it received $2^{13}$ pulses.

Temperature warning circuit 28, when actuated by an overheat condition, overrides low frequency oscillator 36 in signal control 34 so that buzzer 32 produces a steady sound.

Test button 14, shown in both FIGS. 2 and 3, simply serves to apply a voltage to the oscillator (similar to that from the probe) so that the operator can make a short test to assure himself the circuit is working.

Product selection lights 27 are positioned behind buttons 16 and illuminate the particular button pushed so the operator knows the timer is working and can identify the product for which the unit is set.

Figure 4A:
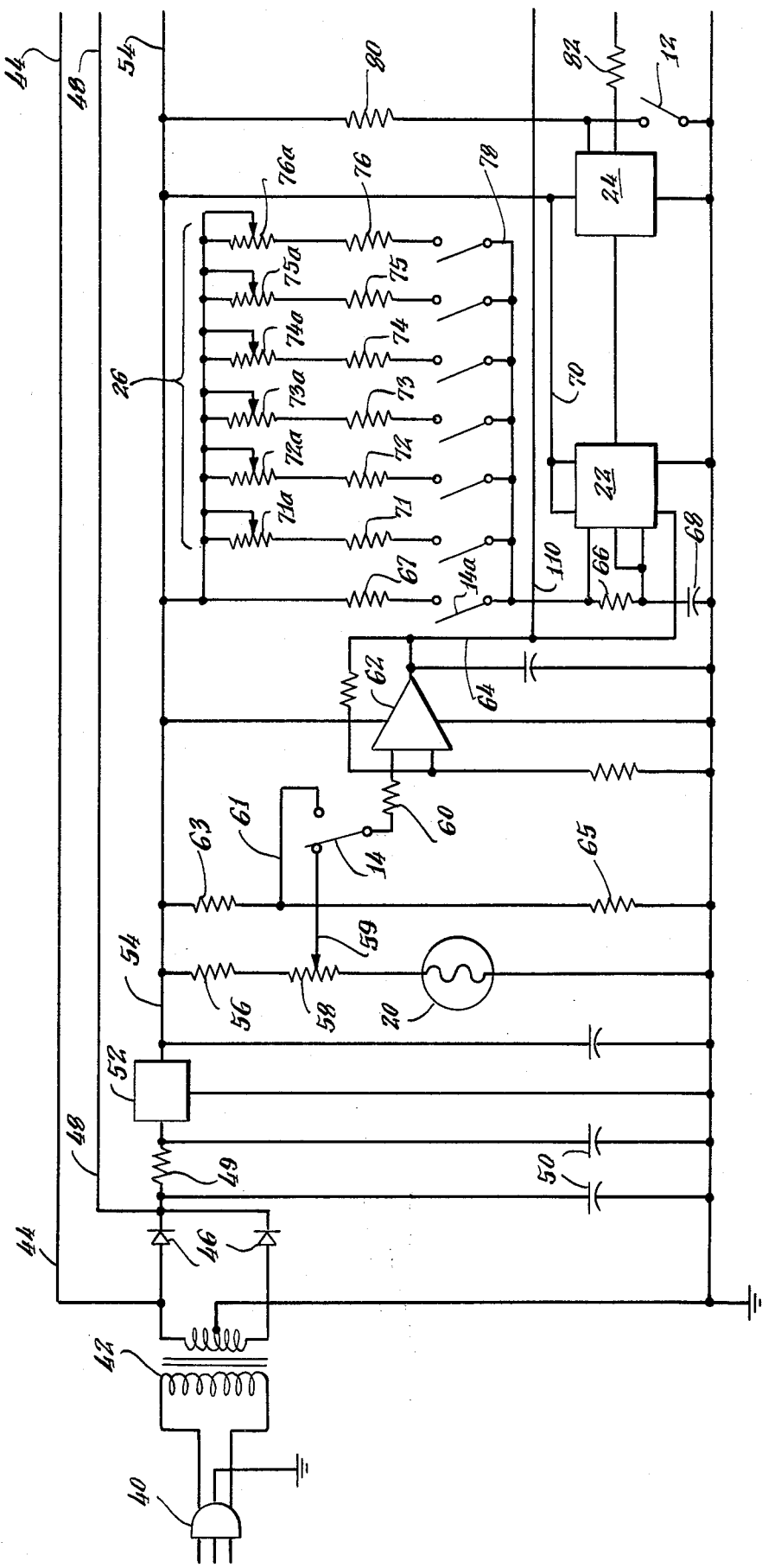
FIGS. 4a and 4b show the circuitry itself.
Figure 4B:
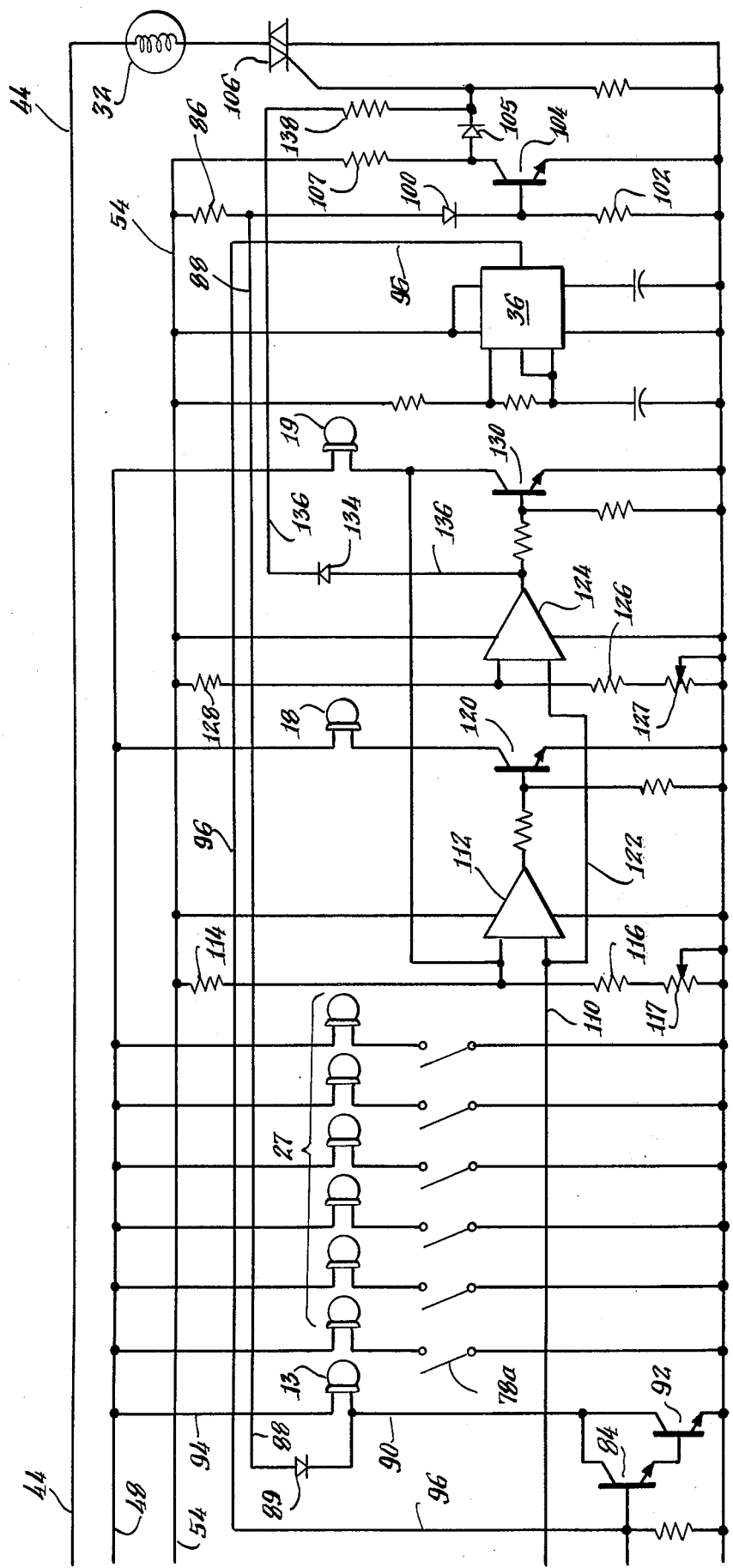

The actual circuit represented by FIG. 3 is shown on FIGS. 4a and 4b. To the extent feasible the same numbers have been used in FIGS. 2, 3, 4a and 4b.

Viewing FIGS. 4a and 4b (which together make up the circuit) from left to right, there is disclosed a power supply providing regulated direct current voltage, thermistor probe 20, test circuit 14, the product selection control circuitry 26, and shown below that, oscillator 22 and counter 24, "off" light 13, the products lights 27, "ready" light 18 and its circuitry, "overheat" light 19 and its circuitry, and buzzer 32 and its circuitry.

The circuit is activated through base plug 40 leading to step-down transformer 42, having a secondary which is grounded at its center tap. In the present embodiment lead 44 comes from the upper end of the secondary and provides 18 volts AC in lead 44 (used to operate buzzer 32). Leads from the secondary of transformer 42 pass through rectifying diodes 46 to line 48 which carries 24 volts unregulated positive DC. This is used to operate the various lightbulbs previously referred to. This same rectified voltage passes through a filter circuit made up of resistor 49 and capacitors 50 to voltage regulator 52. The output of voltage regulator 52, on lead 54, is 12 volts positive, regulated DC voltage.

Thermistor probe 20, in series with resistor 56 and tapped resistor 58, forms a voltage dividing network between the 12 volts on lead 54 and ground. Probe 20, as will be recalled, is positioned in one of the cooking vats and used to sense the temperature. Variable tap 59 on resistor 58 picks off a voltage functionally related to the temperature of the probe 20 and carries it through test switch 14 and resistor 60 to voltage amplifier 62. (Test switch 14 is normally in the position which connects tap 59 with resistor 60.) Tap 59 on resistor 58 is used for initial factory adjustment of the units.

The output of voltage amplifier 62 passes through lead 64 to oscillator 22. A second voltage to oscillator 22 is that on resistor 66. Resistor 66 is in series with capacitor 68 (the capacitor of the RC, resistance-capacitor, timing circuit). The voltage on resistor 66 is representative of the voltage, to be described below, on capacitor 68.

The RC timing circuit is formed by one of the pairs of resistors in the product selection control 26 in series with resistor 66 and capacitor 68, between the voltage on lead 54 and ground. The pairs are precision resistors 71, 72, 73, 74, 75, and 76, in series, respectively, with variable resistors 71a, 72a, 73a, 74a, 75a, and 76a. (The variable resistors are used for field adjustment of the unit for particular foods.)

Interlocked gang switch 78 and 78a provides the product selection control 26 (represented by product "start" buttons 16). Switch 78 has a series of leaves interlocked so that only one can be closed at a time. The leaf closed is determined by which start button 16 is pressed and puts one of resistors 71 through 76 (and its respective variable resistor) into the circuit. Since these resistors are of different size, the rate at which capacitor 68 charges will depend upon which resistor is in the circuit.

Ganged with the respective leaves of switch 78 are the leaves of switch 78a. These leaves connect lights 27 between the voltage source on lead 48 and ground, thus showing which button has been pressed.

As mentioned previously, the voltage on capacitor 68 is functionally related to the type of food being cooked and determines the base rate of oscillation of voltage-controlled oscillator 68. This rate is determined by which of the RC resistors is in the circuit, i.e., which type food is being cooked. Being voltage controlled, however, its rate of oscillation is also dependent upon the temperature of the cooking medium, the hotter the medium, the lower will be the probe voltage on lead 64, and so the faster the rate of oscillation. Conversely, the oscillation rate will be lower for lower temperatures in the cooking medium. As mentioned above, cooking time is determined by counting total oscillations. Therefore, if the medium is hot, cooking time will be less, and vice-versa.

Switch 12, shown in FIGS. 2 and 4a, is the "off" button and is also a part of the gang switch unit 78 and 78a. When pressed, it releases whichever leaves of switch 78 and 78a which had been closed.

Oscillator 22 is powered by regulated DC voltage received through lead 70 which is connected with the previously-mentioned lead 54. Oscillator 22 produces an output frequency from about 10 to about 200 cycles per second. This frequency, however, varies with the two input voltages as mentioned above.

The output from oscillator 22 is a series of pulses, at a rate determined by the two input voltages. It goes to counter 24 (also powered by the DC voltage on lead 54). Counter 24 is set to count a predetermined number of pulses and then produce an output signal. In the unit of this invention, the number of pulses counted before producing an output signal is $2^{13}$, that is, 8192 pulse. Thus, by way of example, if the average oscillation rate, during cooking, of oscillator 22 is 32 cycles per second ($2^5$), the total cooking time will be $2^{13}$ divided by $2^5$, i.e., $2^8$ or 256 seconds (4 minutes, 16 seconds).

In practice, the rate of oscillation of oscillator 22 varies during the cooking cycle because the temperature of the cooking oil is cooled as a result of adding the food, and thereafter warms. Consequently, the voltage from thermistor 20 is higher, at the beginning. It is, however, this use of the concept of totallizing pulses that permits the unit to compute precise cooking time, for the frequency of pulses produced is related to cooking temperature and to the particular food being cooked. The frequency of oscillation varies as a logarithmic function of the thermistor voltage. Similarly, required cooking time is a logarithmic function of cooking temperature. Consequently, operation on the proper portion of the respective curves assures uniformity of cooking time.

The output signal from counter 24 passes through resistor 82 and thence to the base of transistor 84. Transistor 84 receives a positive collector voltage from lead 54 through resistor 86 (upper right hand portion of FIG. 4b lead 88, diode 89 and lead 90. The emitter of transistor 84 is led to the base of transistor 92 which has its collector connected to lead 90 and its emitter to ground. Thus an output signal from counter 24, signalling the completion of cooking time, will make transistor 84 conductive and so make transistor 92 conductive. When the latter is conducting, it also closes the circuit through lead 90, bulb 13 and lead 94 to the voltage supply lead 48, thus turning on "off" lamp 13.

It will be noted that the base of transistor 84 also has a current applied to it through lead 96 coming from oscillator 36. (Oscillator 36 has a relatively low frequency of approximately 2 cycles per second.) This oscillating signal on lead 96 serves to override the conductivity of transistor 84 and consequently causes lamp 13 to flash to attract the attention of the user. This will continue until "off" switch 12 is closed, resetting counter 24.

Transistor 104 has its collector connected to power lead 54 through resistor 107 and its emitter connected to ground. Its base is connected between the negative side of diode 100 and resistor 102 in the voltage divider circuit made up of resistor 86, diode 100, and resistor 102, between lead 54 and ground. Transistor 104, therefore, is normally conducting and so, through diode 105, clamps the gate of triac 106 to ground. Triac 106, then, is non-conducting during the timing cycle.

At the end of the timing cycle, transistors 84 and 92 become conducting. This serves to ground the base of transistor 104 (through lead 90, diode 89, and lead 88). Transistor 104 then ceases to conduct, and so the gate of triac 106 is no longer grounded. The gate is given a positive charge through resistor 107 and diode 105. Buzzer 32 then operates.

As mentioned previously, the unit has a "ready" signal light 18 and an "overheat" light 19 (FIGS. 2 and 4b). When the unit is first turned on, the temperature measured by the thermistor probe 20 is low. After amplification by amplifier 62 it goes (in addition to going to oscillator 22) through leads 64 and 110 to the input of comparative amplifier 112. There is also an input to comparative amplifier 112 from the voltage divider circuit leading between the voltage supply 54 and ground through resistors 114, 116 and variable resistor 117. (The latter is for the purpose of setting the voltage comparison level.) As thermistor 20 is heated by the heated shortening, the output of operational amplifier 62 changes until the voltage on lead 110 equals the comparative voltage from the voltage divider circuit entering comparative amplifier 112. This causes a signal to be fed from amplifier 112 to the base of transistor 120 in series with ready light 18, which then becomes conducting and turns on ready light 18. This light will remain on during the operation of the unit as long as the temperature of the shortening is adequately high.

To provide an overheat warning, lead 110 also feeds through lead 122 to a second comparative amplifier 124. This, likewise, has a comparison voltage input provided by voltage divider circuit between power line 54 and ground made up of resistors 125, 126 and 127. When this comparison voltage is reached, the output of amplifier 124 is fed into the base of transistor 130 causing it to become conducting. This transistor is in series with "overheat" lamp 19 between power lead 48 and ground and thus causes "overheat" lamp to give its warning signal. The output of comparator 124 also goes through lead 136 and diode 134, lead 136 and resistor 138 to the gate of triac 106. As such it overrides the oscillation applied to that gate and causes the buzzer 32 to operate continuously.

Test switch 14 has been described so far only in the position connecting the thermistor voltage with amplifier 62. This switch is ganged with switch 14a and represents the test button 14 shown in FIG. 2. When button 14 is pressed, it moves to the right-hand position connecting lead 61 going to the voltage divider circuit made up of resistors 63 and 65 and thus impresses a predetermined voltage upon the input of operational amplifier 62. At the same time switch 14a is closed completing an RC circuit made up of resistor 67, resistor 66 and capacitor 68. Thus, a predetermined voltage comparable to that from the thermistor is applied to comparative oscillator 22, and a short period RC circuit is used for the other comparison voltage. This causes the unit to run through a full cycle in a relatively short time so that the operator can test the unit and be satisfied that it operates before actually cooking food products.

OPERATION

In operation, an electrical supply is provided, thermistor probe 20 is inserted in the shortening in a predetermined place, and the deep fat fryer turned on. After the shortening has reached the desired cooking temperature, a voltage corresponding to it passes through lead 59, switch 14, and resistor 60 to amplifier 62 and thence through leads 64 and 110 to comparative amplifier 112 which results in actuating "ready" light 18. Food products may then be cooked.

If desired, the unit may be tested by pressing "test" button 14. This causes leaf 14 to interconnect the voltage in lead 61 with amplifier 62 and then with oscillator 22; it also causes leaf 14a to close, providing an RC circuit. A short cycle of the unit occurs, resulting in actuation of "off" light 13 and buzzer 32. The operator then knows the circuit is operative and may be used for cooking.

When the food is placed in the shortening for cooking, the button 16 corresponding to the particular type of food is pressed, thus closing the corresponding leaves of ganged switch 78 and 78a. Switch 78a serves to illuminate the button by closing the circuit on the corresponding light. Switch 78 serves to put the proper RC timing resistor into the circuit so that capacitor 68 may be charged through resistor 66 and a signal passed to oscillator 22. Capacitor 68 begins to charge, introducing one of the control voltages into oscillator 22. At the same time the voltage representing the temperature, taken at tap 59, is amplified and also introduced into oscillator 22. The two voltages together control the rate of oscillation and so the number of pulses going to counter 22.

It should be noted that the various factors determining cooking time are accounted for. If the shortening is very hot, a greater rate of oscillation will occur; if cooler, a lower rate. If the food is of a type requiring a short cooking time, the timing resistor is small, allowing capacitor 68 to charge more rapidly, and faster oscillation to occur. If a longer cooking time is needed, the resistor is larger and so the capacitor charges more slowly.

Once counter 24 receives the necessary total pulse count, it actuates light 13 and buzzer 32, both of which pulse due to the effect of free-running oscillator 36.

If the shortening overheats, comparator 124 will be activated by a signal from thermistor 20, light 19 will go on, and the gates of triac 106 held open so that buzzer 32 operates continuously.

As can be seen, multiples of the unit may be provided, such as the second timer 11 in FIG. 2. These multiples can use the same power supply and same overheat, free-running oscillator, and buzzer circuits. Connections can be made with voltage lines 44, 48, and 55 and control lines 88, 96, and 136.

What is claimed:

1. A multi-product cooking computer for timing the cooking of foods immersed in a heated cooking medium, said computer being adapted to compensate for variations in temperature of the medium and in the type of food being cooked, said computer including,
    a temperature sensing probe adapted to be positioned in said medium and to produce an electrical signal corresponding to the temperature of said medium,
    a plurality of timing circuits, each corresponding to a pre-selected type of food and producing an electrical signal related to the required amount of cooking for the respective food types,
    a signal controlled oscillator adapted to have its rate of oscillation controlled by said two electrical signals, said rate increasing for increasing cooking medium temperatures and decreasing for longer required cooking times for particular foods,
    a counter associated with said oscillator to receive the output of said oscillator and produce an output signal at a pre-determined oscillation count, and an operator warning device activated by said output signal,
    whereby a variety of foods may be individually cooked in said medium and the time of cooking determined by the type food and the temperature of the cooking medium.

2. A cooking computer as set forth in claim 1 in which said oscillator frequency varies as a logarithmic function of said electrical signal from said temperature sensing probe.

3. A cooking computer as set forth in claim 1 including an interlock associated with said timing circuits and adapted to allow only one said circuit to be operative at a time.

4. A cooking computer as set forth in claim 3 including lights associated with and operative with said individual timing circuits to indicated which said circuit is operative at a given time.

5. A cooking computer as set forth in claim 3 in which said timing circuits are RC circuits having a common capacitor and the said electrical signal from said timing circuit is functionally related to the voltage on said capacitor.

6. A cooking computer as set forth in claim 5 in which the size of the resistor in said RC circuit differs between said RC circuits whereby the desired cooking time is varied to correspond to different types of foods.

7. A cooking computer as set forth in claim 1 including "off" switch means for disengaging said timing circuits, said switch means including means for resetting said counter and for de-activating said operator warning device.

8. A cooking computer as set forth in claim 1 in which said temperature sensing probe is a thermistor in series with a voltage dividing circuit whereby said electrical signal corresponding to the temperature of said medium is a voltage in said voltage dividing circuit.

9. A cooking computer as set forth in claim 1 including a test circuit for checking the operatibility of said cooking computer, said test circuit including a pre-determined electrical signal in lieu of said temperature sensing probe output and a separate timing circuit having a relatively short "cooking" period whereby a rapid test of said computer may be made.

10. A cooking computer as set forth in claim 1 including a second oscillator of relatively low frequency, said second oscillator being associated with said operator warning device to cause it, when operative, to oscillate at said relatively low frequency and thereby more readily attract the attention of the operator.

11. A cooking computer as set forth in claim 1 including means associated with said temperature sensing probe to detect overheating of said cooking medium and means actuated thereby for warning the operator of said overheating.

12. A cooking computer as set forth in claim 11 including means associated with said overheating warning means to override said second oscillator.

13. A cooking computer as set forth in claim 11 including a "ready" light associated with said temperature sensing probe and having means to actuate same when the output signal from said probe corresponds to a pre-determined minimum temperature of said medium.

14. A multi-product cooking computer for timing the cooking of foods in a hot cooking medium such as shortening, said computer being adapted to compensate for changes in temperature of the cooking medium and for desired cooking times (at varying cooking medium temperatures) for different foods, said computer including
    a "start" switch to be actuated by the operator at the commencement of the cooking period, said start switch including means for selecting the type of food being cooked,
    a timing cycle circuit actuated by said start switch,
    a warning signal activated by said timing cycle circuit at the end of its timing cycle,
    a thermistor temperature sensor in said cooking medium and an associated circuit adapted to produce an output signal functionally related to the temperature of said cooking medium,
    a food-type circuit actuated by said start switch to produce an output signal functionally related to the length of cooking time required by a particular food,
    said timing cycle circuit including a timing oscillator and a counter said counter receiving the output of said oscillator and being set to activate said warning signal after receiving a pre-determined number of oscillations, said timing oscillator being adapted to have its rate of oscillation controlled by said temperature-related output signal and said food-type output signal so that the rate of oscillation will decrease for decreased cooking medium temperature and will decrease for longer desired cooking times, whereby said warning signal will be activated a length of time after commencement of the timing cycle which is dependent upon the temperature of the cooking medium and upon the amount of cooking required by a particular type food, thereby providing for uniformity in cooking.

15. A cooking computer as set forth in claim 14 including an "off" switch and associated circuitry adapted to de-activate said warning signal and said timing cycle circuit and to re-set said counter.

16. A cooking computer as set forth in claim 14 in which said start switch can actuate a plurality of food-type circuits but is interlocked so as to be able to actuate only one at a time.

17. A cooking computer as set forth in claim 16 in which said food type circuits are RC circuits having a common capacitor.

18. A cooking computer as set forth in claim 14 including a test timing cycle circuit providing a predetermined input signal independent of the temperature of the cooking medium whereby said computer may be operated on a shorter cycle for testing its operability.

* * * * *